United States Patent
Won

(10) Patent No.: US 12,137,408 B2
(45) Date of Patent: Nov. 5, 2024

(54) ACCESS CONTROL FOR USER EQUIPMENT IN A CONNECTED MODE

(71) Applicant: Nokia Technologies Oy, Espoo (FI)

(72) Inventor: Sung Hwan Won, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/256,476

(22) PCT Filed: Jul. 2, 2018

(86) PCT No.: PCT/EP2018/067793
§ 371 (c)(1),
(2) Date: Dec. 28, 2020

(87) PCT Pub. No.: WO2020/007438
PCT Pub. Date: Jan. 9, 2020

(65) Prior Publication Data
US 2021/0235371 A1 Jul. 29, 2021

(51) Int. Cl.
*H04W 48/16* (2009.01)
*H04W 48/08* (2009.01)
*H04W 48/18* (2009.01)

(52) U.S. Cl.
CPC .......... *H04W 48/16* (2013.01); *H04W 48/08* (2013.01); *H04W 48/18* (2013.01)

(58) Field of Classification Search
CPC ...... H04W 48/16; H04W 48/08; H04W 48/18
See application file for complete search history.

(56) References Cited

U.S. PATENT DOCUMENTS 9,930,591 B2  3/2018  Won et al.
10,455,637 B1*  10/2019  Youtz .................. H04W 60/005
(Continued)

FOREIGN PATENT DOCUMENTS

CN  101335993 A  12/2008
CN  106937238 A  7/2017
(Continued)

OTHER PUBLICATIONS

International Search Report and Written Opinion for Patent Cooperation Treaty Application No. PCT/EP2018/067793 dated Aug. 31, 2018, 16 pages.
(Continued)

*Primary Examiner* — Steven S Kelley
(74) *Attorney, Agent, or Firm* — ALSTON & BIRD LLP

(57) ABSTRACT

A user equipment operating in a connected mode includes a first layer, a second layer, and a third layer. The first layer generates a request to send a non-initial non-access stratum (NAS) message over a first connection that operates according to a first radio access technology (RAT). The second layer determines whether access to the first connection is barred for the non-initial NAS message. The first layer selects a connection to deliver the non-initial NAS message between the first connection and a second connection that operates according to a second RAT in response to access to the first connection being barred. In some cases, the non-initial NAS message is a mobile originated short message service (SMS) message or an uplink NAS transport message. In some cases, the first layer is an NAS layer and the second layer is a radio resource control layer.

5 Claims, 6 Drawing Sheets

(56) References Cited

U.S. PATENT DOCUMENTS

| | | | |
|---|---|---|---|
| 2013/0307489 A1 | 11/2013 | Kusch et al. | |
| 2013/0324170 A1* | 12/2013 | Watfa | H04W 4/14 455/466 |
| 2014/0376483 A1* | 12/2014 | Hong | H04W 72/048 370/329 |
| 2015/0071747 A1 | 3/2015 | Deahl et al. | |
| 2015/0304936 A1 | 10/2015 | Jung et al. | |
| 2016/0021592 A1 | 1/2016 | Vesely et al. | |
| 2016/0227468 A1 | 8/2016 | Kim et al. | |
| 2016/0249266 A1 | 8/2016 | Kim et al. | |
| 2017/0222933 A1 | 8/2017 | Adjakple et al. | |
| 2018/0007720 A1 | 1/2018 | Shu et al. | |
| 2019/0061544 A1 | 2/2019 | Jansen et al. | |
| 2019/0313473 A1 | 10/2019 | Kim et al. | |
| 2019/0349849 A1* | 11/2019 | Kavuri | H04W 60/04 |
| 2020/0037386 A1* | 1/2020 | Park | H04W 76/25 |
| 2020/0084691 A1* | 3/2020 | Wallentin | H04W 76/27 |
| 2020/0120585 A1* | 4/2020 | Kumar | H04W 68/12 |
| 2020/0178158 A1* | 6/2020 | Won | H04W 48/04 |
| 2020/0260325 A1* | 8/2020 | Futaki | H04W 76/22 |
| 2020/0404734 A1* | 12/2020 | Watfa | H04W 76/25 |
| 2021/0058986 A1* | 2/2021 | Wang | H04W 48/16 |
| 2021/0153286 A1* | 5/2021 | Park | H04W 76/22 |
| 2021/0258745 A1* | 8/2021 | Tiwari | H04W 8/02 |

FOREIGN PATENT DOCUMENTS

| | | |
|---|---|---|
| KR | 101755003 B1 | 7/2017 |
| RU | 2628327 C2 | 8/2017 |
| WO | WO 2009/087099 A1 | 7/2009 |
| WO | WO 2018/008927 A1 | 1/2018 |
| WO | WO-2018/086416 A1 | 5/2018 |

OTHER PUBLICATIONS

"3rd Generation Partnership Project; Technical Specification Group Core Network and Terminals; Non-Access-Stratum (NAS) Protocol for 5G System (5GS); Stage 3 (Release 15)", 3GPP TS 24.501 v15.0.0 (Jun. 15, 2018), 338 pages.

Huawei et al., "Clean Up to TS 24.501", 3GPP Draft, 3GPP TSG-CT WG1 Meeting #109, C1-181456 (Feb. 26-Mar. 2, 2018), 20 pages.

Ericsson, "5G N3A—Establishment Cause", 3GPP Draft, 3GPP TSG-CT WG1 Meeting #111, C1-183041 (May 21-25, 2018), 8 pages.

"Universal Mobile Telecommunications System (UMTS); LTE; Non-Access-Stratum (NAS) protocol for Evolved Packet System (EPS); Stage 3 (3GPP TS 24.301 version 13.6.1 Release 13)", ETSI TS 124 301 v13.6.1 (Aug. 2016), 441 pages.

Office Action for Russian Application No. 2020142716/07 dated Jun. 18, 2021, 14 pages.

Office Action for ARIPO Application No. AP/P/2020/012797 dated Feb. 8, 2022, 4 pages.

Office Action for Chilean Application No. 202003385 dated Mar. 14, 2022, 17 pages.

Office Action for Japanese Application No. 2020-573394 dated Mar. 22, 2022, 7 pages.

Office Action for ARIPO Application No. AP/P/2020/012797 dated Nov. 23, 2021, 5 pages.

Office Action for Algerian Application No. DZ/P/2020/000688 dated Oct. 10, 2021, 2 pages.

Office Action for Australian Application No. 2018430794 dated Oct. 8, 2021, 4 pages.

Notice of Acceptance for Australian Application No. 2018430794 dated Dec. 22, 2021, 3 pages.

Office Action for Taiwan Application No. 108123298 dated Apr. 6, 2020, 10 pages.

Notice of Allowance for Taiwan Application No. 108123298 dated Apr. 30, 2021, 3 pages.

Office Action for Korean Application No. 10-2020-7037269 dated Oct. 29, 2021, 10 pages.

Office Action for Canadian Application No. 3,104,732 dated Jan. 7, 2022, 3 pages.

First Examination Report for Indian Application No. 202127003107 dated Jan. 6, 2022, 6 pages.

Decision to Grant for Russian Application No. 2020142716 dated Oct. 20, 2021, 15 pages.

Decision of Refusal for Japanese Application No. 2020-573394 dated Oct. 11, 2022, 2 pages.

Notice of Allowance for Korean Application No. 10-2020-7037269 dated Jun. 17, 2022, 3 pages.

Office Action for European Application No. 18740525.3 dated Jun. 21, 2022, 4 pages.

Office Action for Thailand Application No. 2001007346 dated Oct. 18, 2021, 3 pages.

Office Action for Colombian Application No. NC2021/0000903 dated Aug. 23, 2023, 22 pages.

Notice of Allowance for Canadian Application No. 3,104,732 dated Mar. 13, 2023, 1 page.

Office Action for Egyptian Application No. 2114/2020 dated Feb. 14, 2023, 5 pages.

Office Action for Indonesian Application No. P00202100586 dated May 29, 2023, 7 pages.

Office Action for Vietnamese Application No. 1-2021-00288 dated Dec. 28, 2023, 3 pages.

Reconsideration Report for Japanese Application No. 2020-573394 dated Apr. 4, 2023, 6 pages.

Trial and Appeal Decision for Japanese Application No. 2020-573394 dated Sep. 25, 2023, 4 pages.

Office Action for Chinese Application No. 201880094981.7 dated Dec. 26, 2023, 13 pages.

Office Action for Saudi Arabian Application No. 520420928 dated Mar. 19, 2024, 16 pages.

Office Action for ARIPO Application No. AP/P/2020/012797 dated Jul. 31, 2024, 5 pages.

Office Action for Chinese Application No. 201880094981.7 dated Jun. 14, 2024, 12 pages.

Office Action for Saudi Arabian Application No. 520420928 dated Jul. 29, 2024, 12 pages.

Office Action for Malaysian Application No. PI2020006894 dated Aug. 15, 2024, 5 pages.

\* cited by examiner

ACCESS CONTROL FOR USER EQUIPMENT IN A CONNECTED MODE

CROSS-REFERENCE TO RELATED APPLICATIONS

This Application is a National Stage Entry of International Patent Application No. PCT/EP2018/067793, filed Jul. 2, 2018, entitled "Access Control For User Equipment In A Connected Mode," the entire disclosures of which are hereby incorporated herein by reference in their entireties for all purposes.

BACKGROUND

Wireless communication systems include a network of base stations (which are also referred to as radio access networks, gNodeBs, eNodeBs, or access points) that provide wireless connectivity to one or more user equipment within corresponding geographic areas or cells. In order to conserve battery power, a user equipment is able to operate in an idle mode that consumes less power but does not permit the user equipment to transmit uplink data to a core network. The user equipment is required to transmit an access attempt to the base station to acquire a radio connection and enter the connected mode, which permits the user equipment to transmit uplink data. The base station and/or the core network can become overloaded if too many user equipment use or attempt to use network resources. Some access attempts by idle user equipment are therefore barred (i.e., prevented or prohibited) to reduce or limit resource consumption by the user equipment. For example, a network that operates according to Fourth Generation (4G) standards defined by the Third Generation Partnership Project (3GPP) such as Long Term Evolution (LTE) standards imposes access restrictions on idle user equipment to prevent the idle user equipment from registering or establishing a radio resource control (RRC) connection to the network. Access barring is typically performed by transmitting a barring configuration to the user equipment so that the user equipment can determine when an access attempt is barred.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
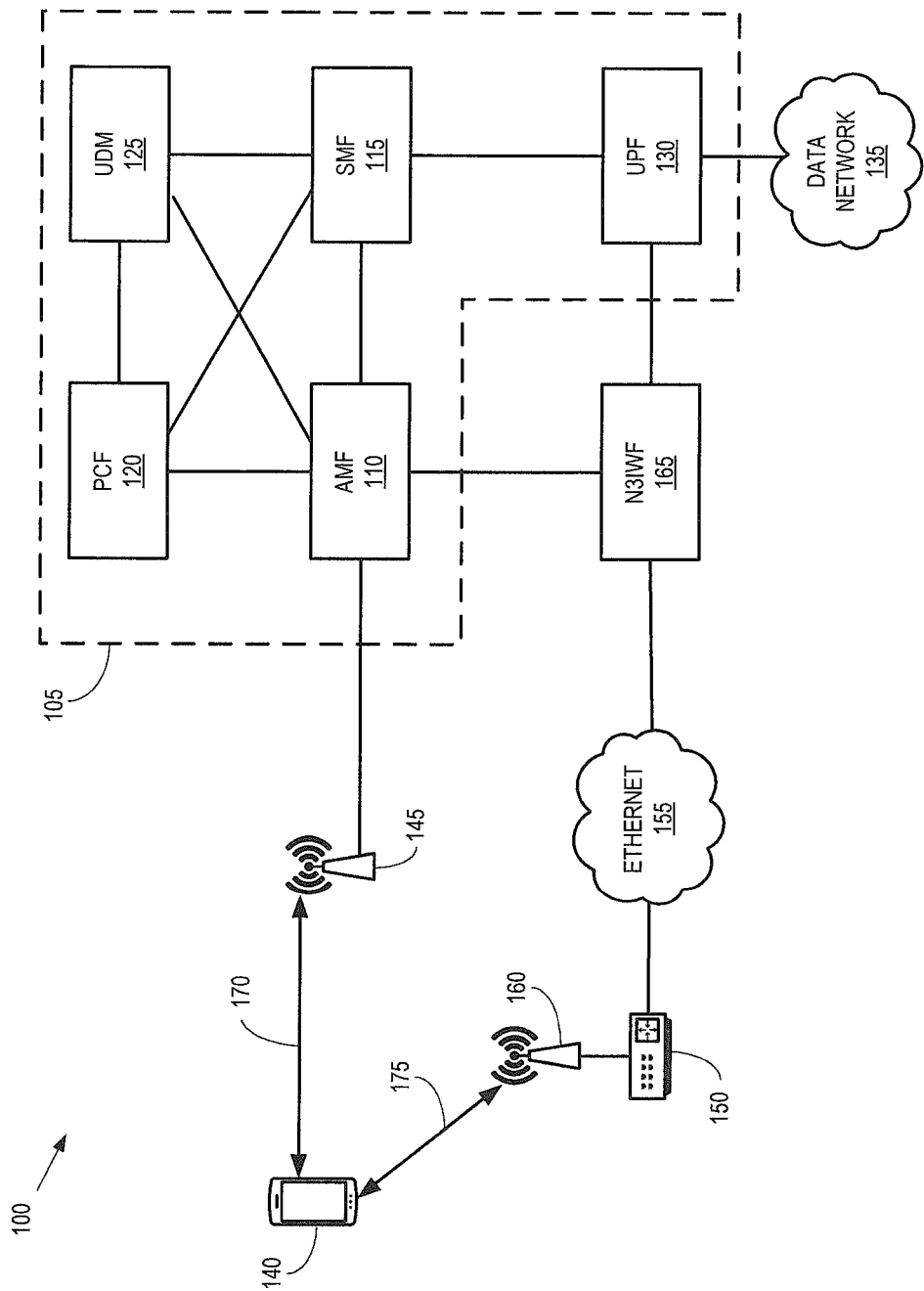
FIG. 1 is a block diagram of a communication system that supports access control and selective use of 3GPP and non-3GPP connections for access attempts according to some embodiments.

Fifth Generation (5G) standards defined by the 3GPP are designed to alleviate a global bandwidth shortage by supporting wireless communication at frequencies above 6 gigahertz (GHz), such as the millimeter wave frequency range between 30 and 300 GHz. The 5G standards apply access barring to user equipment in the idle mode, connected-active mode, and connected-inactive mode. Thus, access barring is applied not only to initial non-access stratum (NAS) messages such as registration requests, deregistration requests, and service requests that are transmitted by user equipment in the idle mode but also to non-initial NAS messages such as requests to transmit short message service (SMS) messages over NAS, uplink NAS transport messages to establish packet data unit (PDU) sessions, and uplink NAS transport messages to request modification of a PDU session that are transmitted by user equipment in the connected mode.

However, current 5G standards do not define how to handle the case when an access attempt triggering non-initial NAS message is barred. Some embodiments of user equipment support concurrent 3GPP and non-3GPP connections. The 5G standards therefore allow a mobile-originated SMS-over-NAS message to be delivered from the user equipment via 3GPP access or non-3GPP access, e.g., via a connection to a Wi-Fi access point. However, if a 3GPP access lower layer of the user equipment (e.g., an access stratum, AS, layer below the NAS layer) bars an access attempt such as a request to transmit a mobile-originated SMS-over-NAS message via a 3GPP connection, the connected user equipment is not able to utilize the non-3GPP connection.

A user equipment is prohibited from sending a non-initial non-access stratum (NAS) message (e.g., an uplink NAS transport message) using a 3GPP connection if the radio resource control (RRC) layer of the user equipment indicates that the access attempt is barred. The non-initial NAS message is subsequently sent over the 3GPP connection, if still needed, when the RRC layer indicates that the barring is alleviated for the access category with which the access attempt was associated. However, if the user equipment supports both a 3GPP connection and a non-3GPP connection, the user equipment selectively requests transmission of a mobile-originated message over the 3GPP connection or the non-3GPP while the user equipment is in the connected mode. Selection of the 3GPP connection or the non-3GPP connection for transmission of the mobile-originated message is performed based on whether the request is barred in the RRC layer of the user equipment. For example, a NAS layer in the user equipment can transmit a query indicating a category or identity of the access request to the RRC layer, which returns a result indicating whether the access category or identity is barred. The user equipment transmits the request over the non-3GPP connection, if available, in response to the request being barred in the RRC layer and transmits the request over the 3GPP connection in response to the request not being barred in the RRC layer.

In some embodiments, selectively requesting transmission of the mobile-originated message is performed for one or more predetermined access categories or identities. For example, the user equipment can selectively request transmission of a short message service (SMS) over non-access stratum (NAS) message, an uplink NAS transport message to establish a packet data unit (PDU) session, or an uplink NAS transport message to request modification of a PDU session based on whether messages in these access categories are barred. Access attempts associated with an access category that is barred at the user equipment are required to cease until the RRC layer indicates that access barring has been alleviated for the corresponding access category. Once the access barring has been alleviated, the user equipment initiates a transport procedure over the 3GPP connection, if still needed.

FIG. 1 is a block diagram of a communication system 100 that supports access control and selective use of 3GPP and non-3GPP connections for access attempts according to some embodiments. As used herein, a 3GPP connection refers to a connection that operates according to standards established by the 3GPP such as 5G standards or LTE standards. Thus, a 3GPP connection is a connection that operates according to a first radio access technology (RAT). As used herein, a non-3GPP connection refers to a connection that operates according to non-3GPP standards such as Wi-Fi standards for wireless access in an unlicensed frequency band. Thus, a non-3GPP connection is a connection that operates according to a second RAT that differs from the first RAT. Some embodiments of the communication system 100 implement different first and second RATs, although the techniques disclosed herein are discussed in the context of 3GPP and non-3GPP connections in the interest of clarity.

The communication system 100 provides support for both mobile and fixed access. As used herein, the term "mobile access" refers to accessing a communication system (e.g., the communication system 100) over an air interface. Mobile access can therefore be referred to as wireless access, mobile communication, wireless communication, or other similar terms. The term "fixed access" refers to accessing to a communication system using a device that is physically connected to the communication system, e.g., accessing a communication system such as the communication system 100 via wires, optical fibers, and the like. Fixed access can therefore be referred to as wireline access, wired communication, or other similar terms. In some embodiments, the final leg of a fixed access connection can be provided by a wireless access point such as a Wi-Fi access point. The communication system 100 supports hybrid access that allows devices to concurrently access the communication system 100 using mobile access and fixed access.

The communication system 100 includes a core network 105 that is accessible by either mobile or fixed devices using a common user plane access and a control plane that supports common authentication, authorization, and accounting (AAA) and policy control. As used herein, the phrase "user plane" refers to a portion of a routing architecture that performs routing of packets that arrive on an inbound interface. For example, the user plane can be implemented using routing tables to determine a path from the inbound interface through a forwarding fabric to the proper outgoing interface. The user plane can also be referred to as a data plane or a forwarding plane. As used herein, the phrase "control plane" refers to a portion of the routing architecture that defines a network topology. For example, the control plane can be used to configure the routing tables that are used to forward packets on the user plane. Control plane logic can also be used to establish priority or quality-of-service for the packets or to identify packets that should be discarded.

The core network 105 includes an access and mobility management function (AMF) 110 that manages access control and mobility for devices in the communication system 100. The core network 105 also includes a session management function (SMF) 115 to set up and manage sessions in the communication system 100 according to network policies. An association between user equipment and the core network 105 can be represented as a protocol data unit (PDU) session that can be managed by the SMF 115. The PDU session supports data connectivity between user equipment and a data network. The core network 105 further includes a policy control function (PCF) 120 that stores policies for the user equipment that are connected to the core network 105. Information stored in the PCF 120 is therefore used to apply policies to actions associated with the user equipment such as mobility restrictions within the communication system 100.

The core network 105 also includes a unified data manager (UDM) 125 that processes credentials, location management, subscription management, and the like. The UDM 125 stores data including user subscription data, such as subscription identifiers, security credentials, access and mobility related subscription data, and session related subscription data. The core network 105 further includes one or more user plane functions (UPF) 130 that can be deployed in the communication system 100 to provide services to users of the communication system 100. The user plane function 130 can function as an endpoint for service flows that are used to broadcast, multicast, or unicast packets, as discussed herein. The user plane function 130 can therefore store endpoint identifiers for the service flows. The user plane function 130 is connected to a data network 135.

Entities within the core network 105 are connected by various interfaces that are implemented according to standards such as the 5G network architecture. Some embodiments of the core network 105 include other functionality such as a authentication function and a network function repository function, which are not shown in FIG. 1 in the interest of clarity. Some embodiments of the core network 105 are implemented using network function virtualization and software defined networking, as discussed herein. For example, different network slices can be used to instantiate different instances of the AMF 110, the SMF 115, the UPF 130, or the UDM 125 for different users or devices. Each protocol data unit (PDU) session is part of one network slice.

The core network 105 provides network access to user equipment 140 via mobile access. For example, the user equipment 140 can access the core network 105 via a base station 145 (or radio access network) that is connected to the AMF 110 over a corresponding interface such as an N2 interface. The base station 145 is also connected to the UPF 120 by a corresponding interface such as an N3 interface, which is not shown in FIG. 1 in the interest of clarity. Some embodiments of the base station 145 are implemented as a 5G gigabit NodeB (gNB) in accordance with 5G standards defined by the 3GPP. The core network 105 also provides network access to the user equipment 140 via fixed access. For example, the user equipment 140 can establish a connection to a residential gateway 150, which has a wired connection to an Ethernet network 155. In the illustrated embodiment, a final leg of the fixed access connection between the user equipment 140 and the core network 105 is implemented using a wireless access technology. For example, a Wi-Fi access point 160 can be used to provide the final leg of the fixed access connection. However, in other cases, the user equipment 140 is connected to the residential gateway 150 using a wired connection. Some embodiments of the wired connection use line termination devices such as a digital subscriber line access multiplexer (DSLAM) or a gigabit passive optical network (GPON).

An interworking function 165 is disposed between the Ethernet network 155 and the core network 105. The interworking function 165 can also be referred to as a non-3GPP interworking function (N3IWF). The interworking function 165 is configured to modify or translate messages conveyed from the fixed access user equipment to the core network 105 so that the fixed access user equipment appears to be accessing the core network 105 according to mobile access standards or protocols from the perspective of the core network 105. The interworking function 165 is also configured to modify or translate messages conveyed from the core network 105 to the fixed access user equipment so that the messages received by the fixed access user equipment conform to corresponding fixed access standards or protocols. The interworking function 165 supports interfaces with the AMF 110 and the UPF 130.

The user equipment 140 operates in an idle mode or one of two connected modes: a connected-inactive mode and a connected-active mode. In the idle mode, the user equipment 140 can select a public land mobile network (PLMN), receive broadcast system information, perform cell reselection mobility, and receive paging messages to inform the user equipment 140 of the availability of mobile-terminated data. The idle user equipment 140 does not transmit uplink data towards the core network 105. The idle user equipment 140 must transition to one of the connected modes to receive downlink data or transmit uplink data.

In the connected-inactive mode, the user equipment 140 receives broadcast system information, performs cell reselection mobility, receive paging messages that are initiated by a radio access network, maintains user plane and control plane connections with the core network 105, and has a corresponding context stored in the radio access network and the user equipment 140. In the connected-active mode, the user equipment 140 maintains user plane and control plane connections with the core network 105 and has a corresponding context stored in the radio access network and the user equipment 140. The radio access network knows an identity of a cell that includes the user equipment 140. Unicast data can be transferred to and from the user equipment 140 in the connected-active mode. The network is also able to control mobility of the user equipment 140, e.g., based on measurements performed by the user equipment 140.

Some embodiments of the user equipment 140 implement multiple transmitters, receivers, or transceivers that operate according to different RATs. For example, the user equipment 140 uses a first transceiver that operates according to the 5G standards defined by 3GPP and a second transceiver that operates according to a non-3GPP standards such as Wi-Fi for communication in an unlicensed frequency band. The user equipment 140 is therefore able to maintain separate, in some cases concurrent, connections that operate according to the different RATs, such as a 5G connection to the base station 145 and a Wi-Fi connection to the access point 160.

If the user equipment 140 is in the idle mode, the user equipment 140 can transmit an access request to initiate a communication session with the core network 105. For example, the access request can be transmitted as an initial non-access stratum (NAS) message. If the access request is accepted, a connection 170 is established between the user equipment 140 and the core network 105, in which case the user equipment 140 enters a connected mode. The idle user equipment 140 also transmits other initial NAS messages such as deregistration requests and service requests. The user equipment 140 transmits non-initial access requests when the user equipment 140 is operating in one of the connected modes. Non-initial NAS requests include requests to transmit short message service (SMS) messages over NAS, uplink NAS transport messages to establish packet data unit (PDU) sessions, and uplink NAS transport messages to request modification of a PDU session that are transmitted by user equipment in the connected mode.

As discussed in detail herein, the user equipment 140 can determine that the non-initial NAS requests are barred so that the user equipment 140 does not transmit the non-initial NAS request over the connection 170 to the base station 145. In some cases, the user equipment 140 transmits a request to send the non-initial NAS message over a connection 175 to the access point 160 in response to determining that the attempt to transmit the request to the base station 145 is barred. For example, the user equipment 140 ceases the request over the connection 170 in response to access to barring of the access requests. The user equipment 140 remains in a current cell and applies a cell reselection process in response to the access to the first connection being barred. The user equipment 140 can then transmit the request using the connection 175 in response to access to the connection 170 being barred. Alternatively, the user equipment 140 transmits the request after ceasing the request in response to the barring being alleviated, if the request is still needed.

Figure 2:
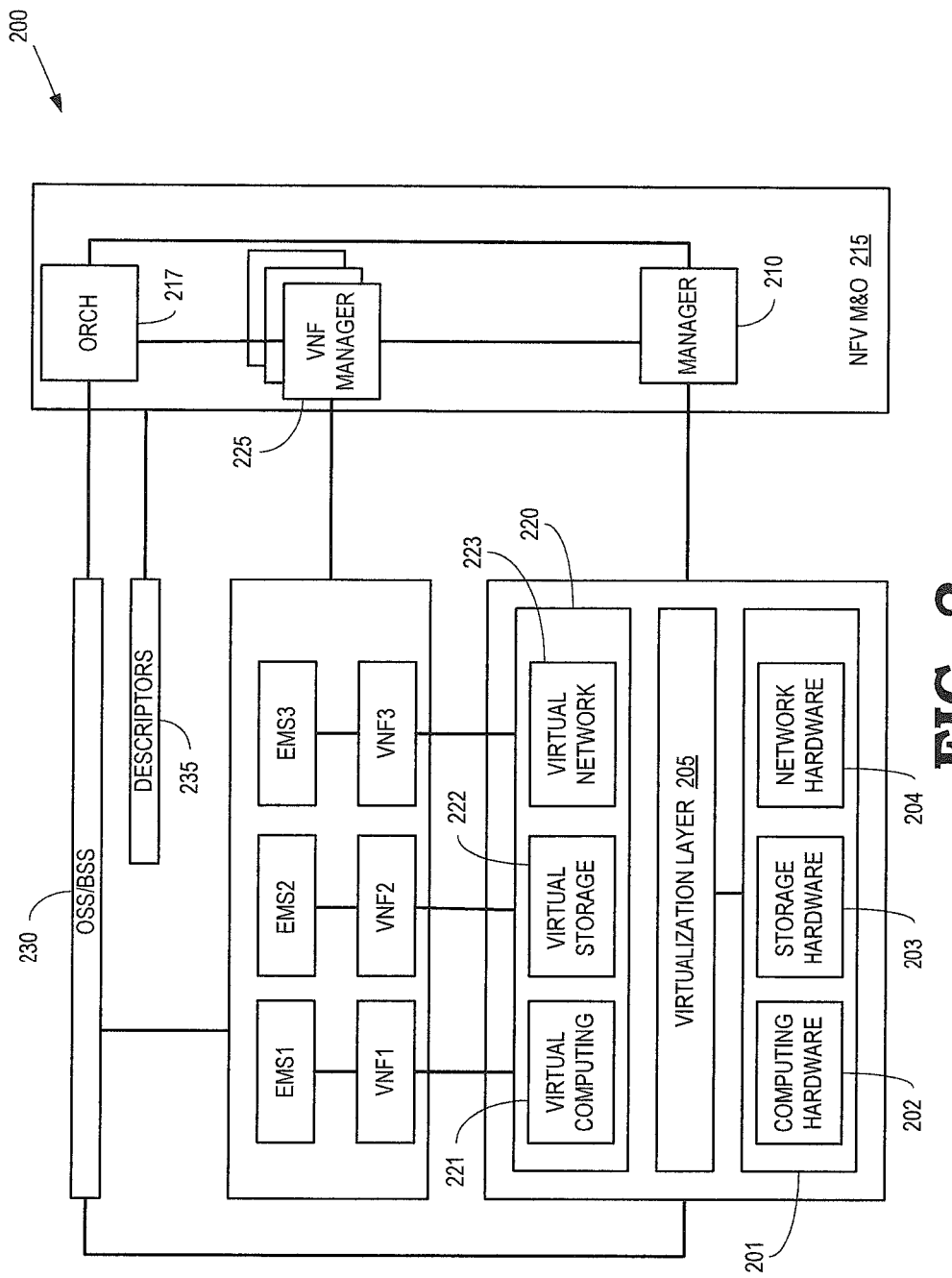
FIG. 2 is a block diagram of a network function virtualization (NFV) architecture according to some embodiments.

FIG. 2 is a block diagram of an NFV architecture 200 according to some embodiments. The NFV architecture 200 is used to implement some embodiments of the communication system 100 shown in FIG. 1. For example, instances of the AMF 110, SMF 115, PCF 120, and UDM 125 can be instantiated as virtual functions in the NFV architecture 200. The NFV architecture 200 includes hardware resources 201 including computing hardware 202, storage hardware 203, and network hardware 204. The computing hardware 202 is implemented using one or more processors, the storage hardware 203 is implemented using one or more memories, and the network hardware 204 is implemented using one or more transceivers, transmitters, receivers, interfaces, and the like.

A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing resources 221, virtual storage resources 222, and virtual networking resources 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 implements network slices that provide control plane functions or user plane functions, such as instances of the AMF 110, SMF 115, AUSF 120, and UDM 125 shown in FIG. 1. A network slice is a complete logical network that provides communication services and network capabilities, which can vary from slice to slice. User equipment can concurrently access multiple slices, that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
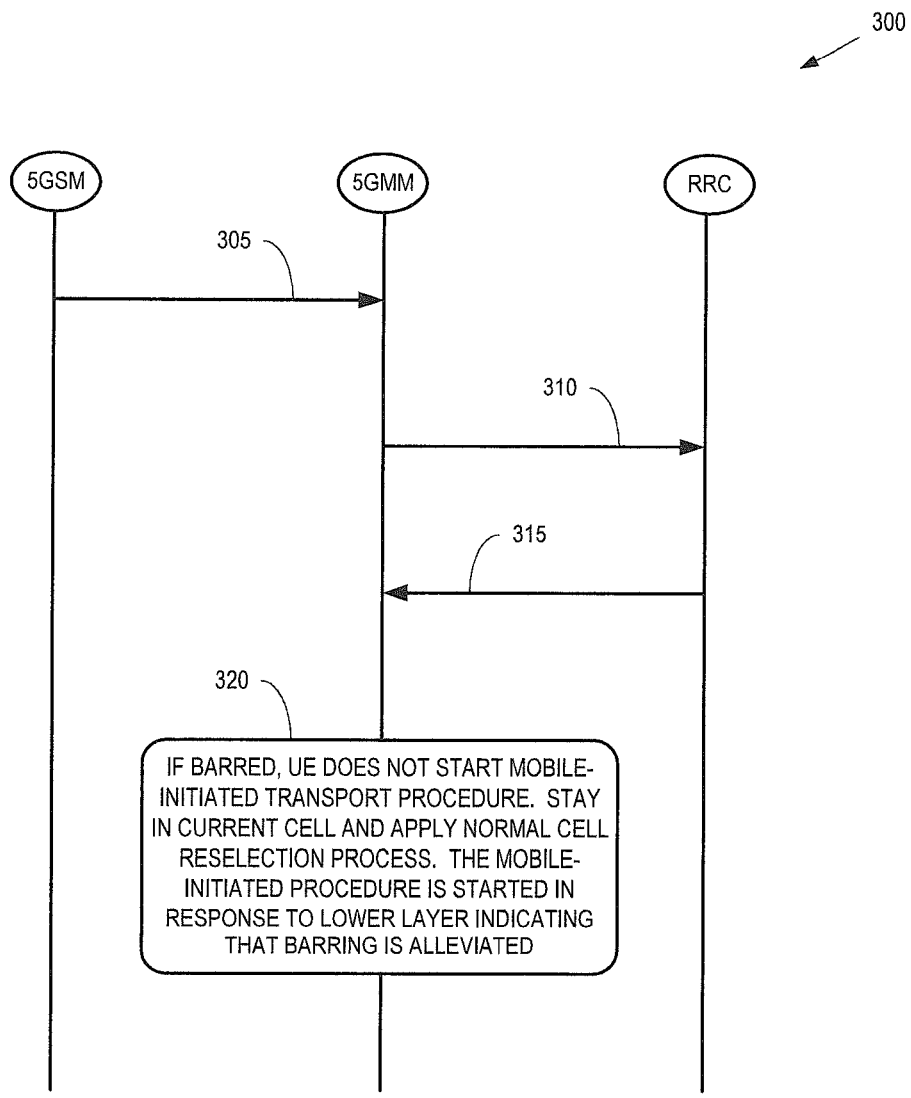
FIG. 3 is a message flow for performing an access request for an initial non-access stratum (NAS) message according to some embodiments.

FIG. 3 is a message flow 300 for performing an access request for an initial NAS message according to some embodiments. The message flow 300 is implemented in some embodiments of the user equipment 140 shown in FIG. 1.

The user equipment includes a session management layer (5GSM), a mobility management layer (5GMM), and a radio resource control (RRC) layer. The session management layer is referred to as an "upper" layer and the RRC layer is referred to as a "lower" layer.

The session management layer transmits a request 305 to send an initial uplink NAS transport message for the purpose of establishing or modifying a PDU session. In response to receiving the request 305, the mobility management layer sends a message 310 that indicates an access category or an access identity (or identities) for the request 305. The message 310 including the request and the access category or identity is transmitted to the lower RRC layer, which determines whether the access request is barred. The RRC layer returns a message 315 indicating the barring results, e.g., "barred" or "not barred." Examples of techniques for determining whether an access request in an access category or having an access identity (or identities) is barred are disclosed in "NETWORK SLICE-SPECIFIC ACCESS BARRING FOR WIRELESS NETWORKS," Ser. No. 62/544,519, filed on Aug. 11, 2017 which is incorporated herein by reference in its entirety. Examples of techniques of unified access control are disclosed in 3GPP Technical Specification 24.501, which is incorporated herein by reference in its entirety.

The user equipment determines (at 320) whether to start the mobile-initiated NAS transport procedure based on the information returned in the message 315. If the message 315 indicates that the access request is barred, the user equipment does not start the mobile-initiated NAS transport procedure. The user equipment remains in a current serving cell and applies a normal cell reselection process. In some cases, the RRC layer subsequently returns another message (not shown in FIG. 3) indicating that the barring is alleviated and the access request is no longer barred. For example, the RRC layer can return a message to the mobility management layer indicating that the barring is alleviated for an access category or an access identifier associated with the previously barred access attempt. If still needed, the mobile-initiated NAS transport procedure is started in response to receiving the message indicating that the barring is alleviated.

Figure 4:
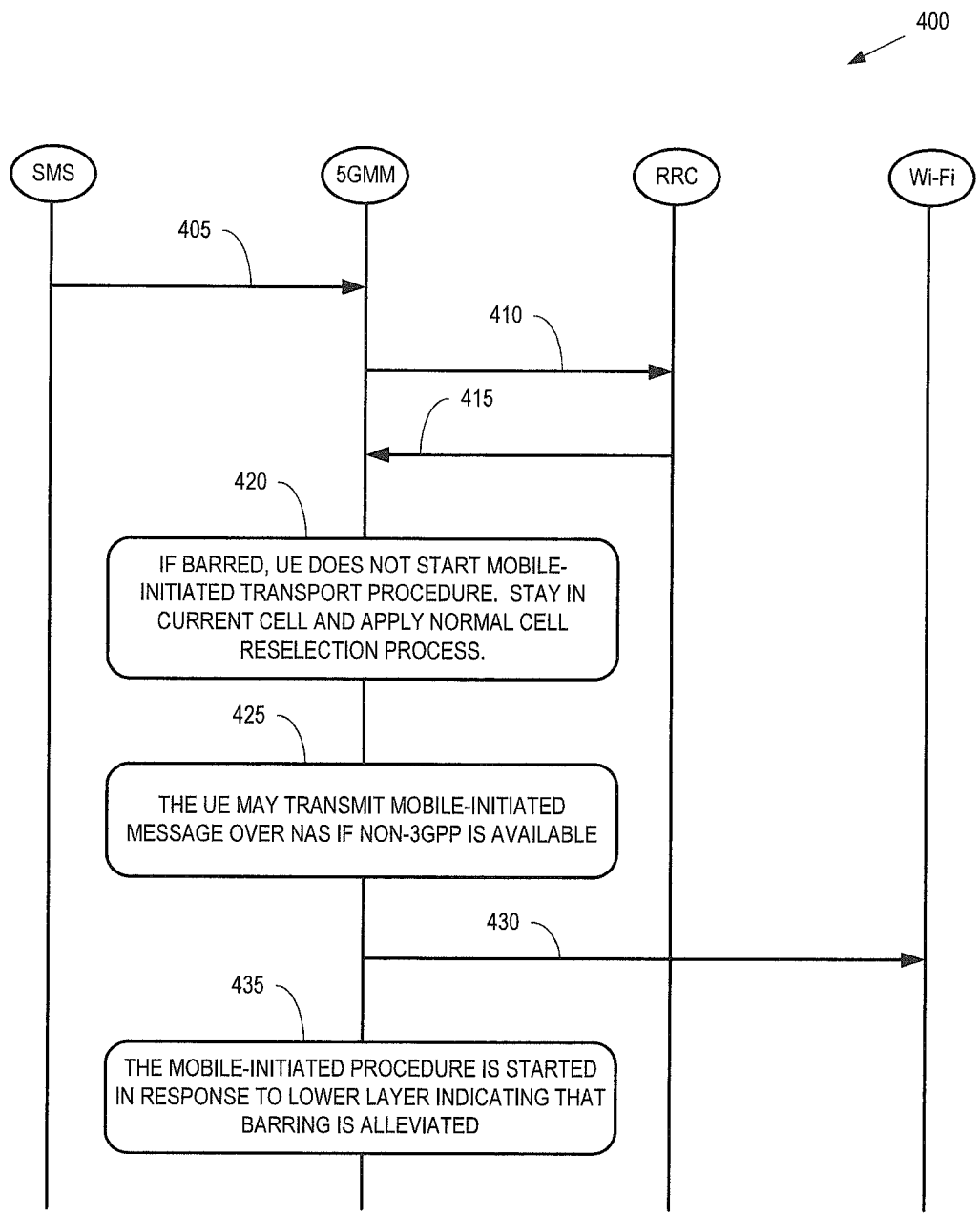
FIG. 4 is a message flow for selectively performing an access request for a non-initial NAS message using a 3GPP or non-3GPP connection according to some embodiments.

FIG. 4 is a message flow 400 for selectively performing an access request for a non-initial NAS message using a 3GPP or non-3GPP connection according to some embodiments. The message flow 400 is implemented in some embodiments of the user equipment 140 shown in FIG. 1. The user equipment includes an SMS layer (SMS), a mobility management layer (5GMM), and a radio resource control (RRC) layer. The session management layer is referred to as an "upper" layer and the RRC layer is referred to as a "lower" layer. The user equipment is operating in a connected mode. Some embodiments of the user equipment are operating in a connected-inactive mode or a connected-active mode. The user equipment implements multiple sets of transmitters, receivers, or transceivers to support communication over a 3GPP connection, e.g., according to 5G standards, and over a non-3GPP connection such as a Wi-Fi connection in an unlicensed frequency band. In the illustrated embodiment, the user equipment is registered to access a data network via both the 3GPP connection and the non-3GPP connection.

The SMS layer of the connected user equipment transmits a request 405 to send a non-initial uplink NAS transport message using the 3GPP connection. In the illustrated embodiment, the SMS layer transmits the request 405 to send a mobile-originated SMS over NAS message. Some embodiments of the SMS layer are also configured to transmit requests for other non-initial uplink NAS transport messages including an uplink NAS transport message to establish a PDU session, an uplink NAS transport message to request modification of a PDU session, and the like.

In response to receiving the request 405, the mobility management layer sends a message 410 that indicates an access category or an access identity (or identities) for the request 405. The message 410 is transmitted to the lower RRC layer, which determines whether the access request for the 3GPP connection is barred. The RRC layer returns a message 415 indicating the barring results, e.g., "barred" or "not barred." The mobility management layer then selects a connection to deliver the non-initial uplink NAS transport message. Some embodiments of the mobility management layer select between the 3GPP connection and the non-3GPP connection in response to access to the first connection being barred.

The user equipment determines (at block 420) whether to transmit the request to send the SMS over NAS message (or other non-initial uplink NAS transport message) using the 3GPP connection based on the information returned in the message 415. If the message 415 indicates that the access request is barred, the mobility management layer in the user equipment does not select the 3GPP connection. The user equipment does not start the mobile-initiated NAS transport procedure to initiate an access attempt for the 3GPP connection. The user equipment remains in a current serving cell and applies a normal cell reselection process.

Since the user equipment is registered to communicate with the data network over a non-3GPP connection such as a Wi-Fi connection, the user equipment determines whether the non-3GPP connection is available. If so, the mobility management layer determines (at block 425) that the user equipment can transmit the SMS over NAS message (or other non-initial uplink NAS transport message) over the non-3GPP connection. The mobility management layer in the user equipment therefore selects the non-3GPP connection and transmits a request 430 to a non-3GPP access lower layer (Wi-Fi) implemented in the user equipment. The request 430 is to send the SMS over NAS message (or other non-initial uplink NAS transport message) using the non-3GPP connection available to the user equipment.

The non-3GPP connection is not always available to the user equipment and so the user equipment is not always able to send the SMS over NAS message (or other non-initial uplink NAS transport message) over the non-3GPP connection. In that case, the user equipment continues to refrain from making an access attempt due to barring. If the RRC layer subsequently returns another message (not shown in FIG. 4) indicating that the barring is alleviated and the access request is no longer barred for the access category or access identifier associated with the previously barred access attempt, the mobile-initiated NAS transport procedure is started (at block 435) in response to receiving the message indicating that the barring is alleviated.

Figure 5:
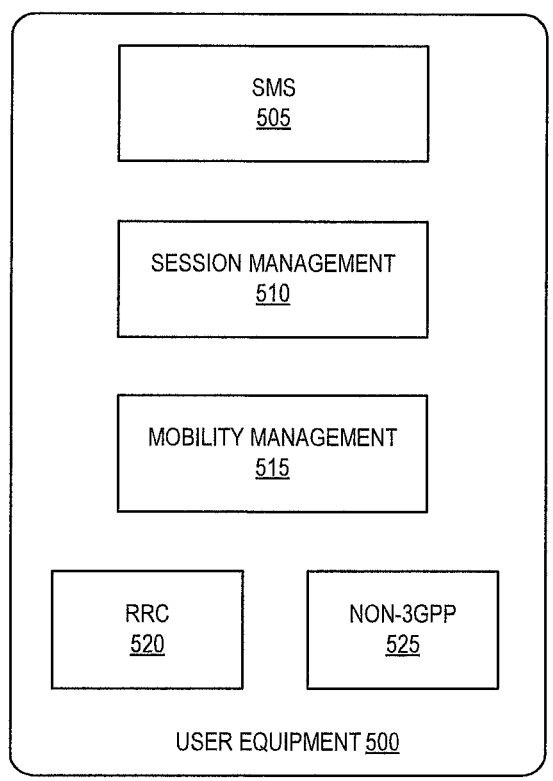
FIG. 5 is a block diagram of a user equipment that supports network access via 3GPP and non-3GPP connections according to some embodiments.

FIG. 5 is a block diagram of a user equipment 500 that supports network access via 3GPP and non-3GPP connections according to some embodiments. The user equipment 500 is used to implement some embodiments of the user equipment 140 shown in FIG. 1. The user equipment 500 is configured to implement some embodiments of the message flow 300 shown in FIG. 3 and the message flow 400 shown in FIG. 4.

The user equipment 500 includes an SMS layer 505 that generates requests to send SMS over NAS messages. Some embodiments of the SMS layer 505 also generate requests for other non-initial uplink NAS messages including an uplink NAS transport message to establish a PDU session, an uplink NAS transport message to request modification of a PDU session, and the like. The user equipment 500 can also implement other layers (not shown in FIG. 5) such as a session management layer that generates initial uplink NAS messages. The user equipment 500 includes a session management layer 510 that is configured to send an initial uplink NAS transport message for the purpose of establishing or modifying a PDU session.

A mobility management layer 515 in the user equipment 500 is configured to determine an access barring status in response to receiving requests from either the SMS layer 505 or the session management layer 510. Some embodiments of the mobility management layer 515, which is also referred to as an NAS layer, generate messages that indicate an access category or an access identity (or identities) for the request. The mobility management layer 515 transmits the request to an RRC layer 520, which determines whether the access request is barred for the 3GPP connection. The RRC layer 520 returns messages to the mobility management layer 515 indicating the barring results, e.g., "barred" or "not barred."

The user equipment 500 also includes a non-3GPP access layer 525 to support communication over a non-3GPP connection such as a Wi-Fi connection. In response to the RRC layer 520 returning a message indicating that the access request is barred for the 3GPP connection, the mobility management layer 515 transmits requests to the non-3GPP access layer 525 to send non-initial uplink NAS messages via the non-3GPP connection. The user equipment 500 can therefore selectively transmit non-initial uplink NAS messages via the 3GPP or non-3GPP connections depending on whether access via the 3GPP connection is barred.

Figure 6:
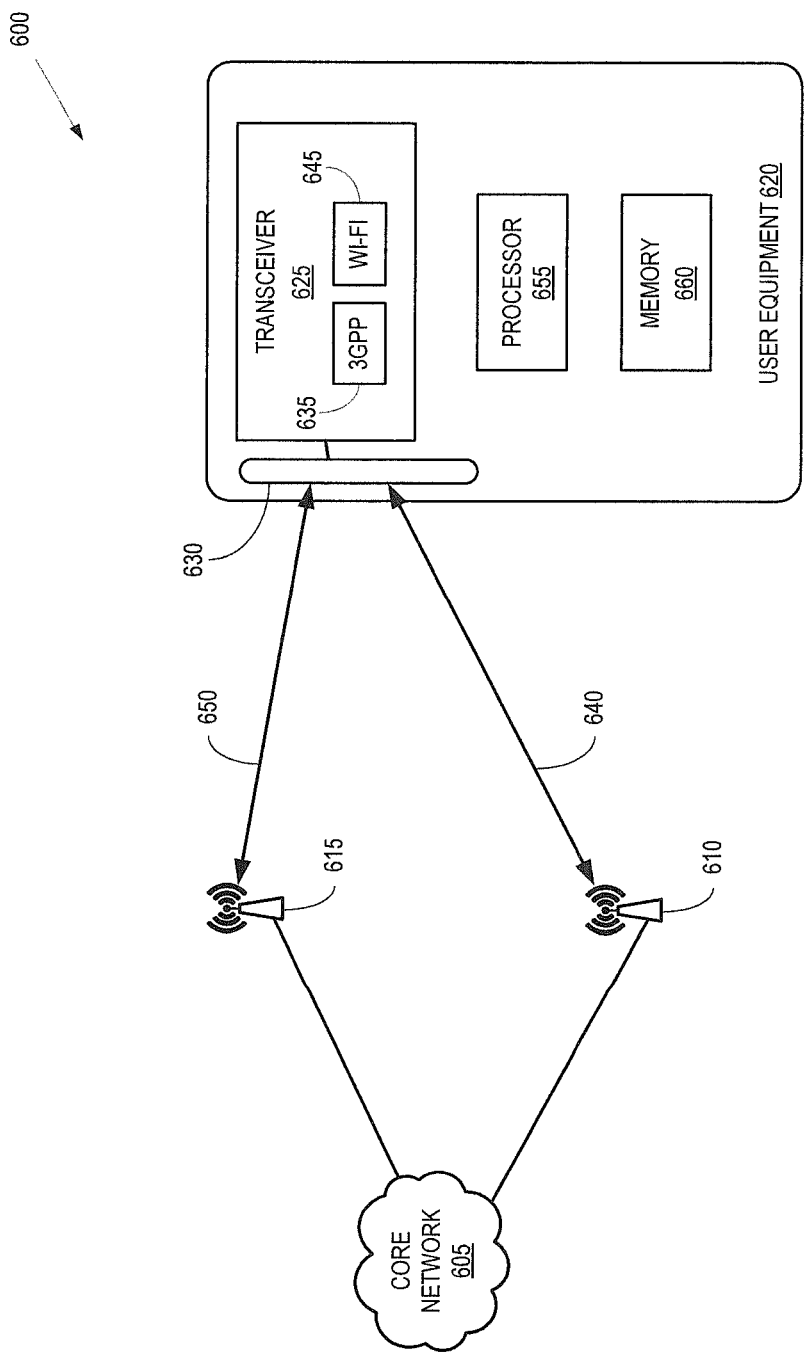
FIG. 6 is a block diagram of a communication system according to some embodiments.

FIG. 6 is a block diagram of a communication system 600 according to some embodiments. The communication system 600 includes a core network 605 that is accessible via a radio access network including a base station 610 that operates according to 5G standards and via an access point 615 that operates according to Wi-Fi standards. Some embodiments of the communication system 600 are accessible via other devices that operate according to RATs, either instead of or in combination with the base station 610 and the access point 615.

The communication system 600 includes a user equipment 620 that is used to implement some embodiments of the user equipment 140 shown in FIG. 1 and the user equipment 500 shown in FIG. 5. The user equipment 620 includes a transceiver 625 for transmitting and receiving signals via antenna 630. Some embodiments of the transceiver 625 include multiple radios for communicating according to different radio access technologies such as a radio 635 for communication over a 3GPP connection 640 to the base station 610 and a radio 645 for communication in unlicensed Wi-Fi frequency bands (Wi-Fi) over a non-3GPP connection 650. The user equipment 620 also includes a processor 655 and a memory 660. The processor 655 executes instructions stored in the memory 660 and stores information in the memory 660 such as the results of the executed instructions. Some embodiments of the transceiver 625, the processor 655, and the memory 660 are configured to perform portions of the message flow 300 shown in FIG. 3 and the message flow 400 shown in FIG. 4.

The user equipment 620 is therefore able to identify and handle the following abnormal case.

Abnormal case: The lower layers indicate that the access attempt is barred.

The UE shall not start the UE-initiated NAS transport procedure. The UE stays in the current serving cell and may apply the normal cell reselection process.

If the event which triggered the access attempt was a request from upper layers to send a mobile originated SMS over NAS (e.g., the access attempt is categorized into access category 6 (which is for mobile-originated SMS) due to a request from upper layers to send a mobile originated SMS over NAS) and the UE is registered to the network via both 3GPP access and non-3GPP access, the UE may transmit the UL NAS TRANSPORT message via non-3GPP access, if available.

Otherwise, the UE-initiated NAS transport procedure is started, if still needed, when the lower layers indicate that the barring is alleviated for the access category with which the access attempt was associated.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A user equipment comprising:
at least one processor; and
at least one memory storing instructions that, when executed by the at least one processor, cause the user equipment to perform at least:
while the user equipment is dual-registered with a network over $3^{rd}$ Generation Partnership Project (3GPP) access and non-3GPP access, while the user equipment is in a fifth-generation mobility management (5GMM)-CONNECTED mode with the network over 3GPP access, and while the user equipment is in either a Radio Resource Control (RRC) active state or an RRC inactive state, receiving, from upper layers of the user equipment, a request for transmission of an uplink Non-Access Stratum (NAS) transport message towards the network to establish a packet data unit (PDU) session between the user equipment and the network or to request modification of a PDU session between the user equipment and the network;
in response to receiving the request from upper layers of the user equipment to transmit the uplink NAS transport message towards the network to establish or request modification of a PDU session between the user equipment and the network, transmitting, using the user equipment, an uplink NAS transport message as a non-initial access attempt towards a node of the network over 3GPP access;
receiving, at lower layers of the user equipment below a NAS layer of the user equipment, over 3GPP access, an indication that the non-initial access attempt is barred by the network, the indication comprising at least one of: a PDU Session Establishment Reject message or a PDU Session Modification Reject message;
determining, using the lower layers of the user equipment below the NAS layer of the user equipment based on the indication, that the non-initial access attempt is barred by the network;
determining, using the lower layers of the user equipment below the NAS layer of the user equipment, that the user equipment is dual-registered to the network via both 3GPP access and non-3GPP access;
determining, using the lower layers of the user equipment below the NAS layer of the user equipment, what triggered the non-initial access attempt;
determining, using the lower layers of the user equipment below the NAS layer of the user equipment, that the non-initial access attempt and the barring by the network are associated with 3GPP access;
in an instance in which the lower layers of the user equipment below the NAS layer of the user equipment determines that the user equipment is dual-registered to the network via both 3GPP access and non-3GPP access, the non-initial access attempt was triggered by a request from upper layers of the user equipment to send an uplink NAS transport message to establish a PDU session or to request modification of a PDU session, and the uplink NAS transport message comprises a request to send a mobile originated short message service (SMS) at the NAS layer of the user equipment, transmitting, using the lower layers of the user equipment below the NAS layer of the user equipment, the uplink NAS transport message towards the network via non-3GPP access; and in an instance in which the lower layers of the user equipment below the NAS layer of the user equipment determine that the barring of the non-initial access attempt is alleviated for 3GPP access, starting a mobile-initiated NAS transport procedure to send the mobile originated SMS at the NAS layer of the user equipment towards the network over 3GPP access.

2. The user equipment according to claim 1, wherein non-3GPP access is access to the network via one or more unlicensed WiFi frequency bands over a non-3GPP connection.

3. A method comprising:

while a user equipment is dual-registered with a network over 3rd Generation Partnership Project (3GPP) access and non-3GPP access, while the user equipment is in a fifth-generation mobility management (5GMM)-CONNECTED mode with the network over 3GPP access, and while the user equipment is in either a Radio Resource Control (RRC) active state or an RRC inactive state, receiving, from upper layers of the user equipment, a request for transmission of an uplink Non-Access Stratum (NAS) transport message towards the network to establish a packet data unit (PDU) session between the user equipment and the network or to request modification of a PDU session between the user equipment and the network;

in response to receiving the request from upper layers of the user equipment to transmit the uplink NAS transport message towards the network to establish or request modification of a PDU session between the user equipment and the network, transmitting, using the user equipment, an uplink NAS transport message as a non-initial access attempt towards a node of the network over 3GPP access;

receiving, at lower layers of the user equipment below a NAS layer of the user equipment, over 3GPP access, an indication that the non-initial access attempt is barred by the network, the indication comprising at least one of: a PDU Session Establishment Reject message or a PDU Session Modification Reject message;

determining, using lower layers of the user equipment below the NAS layer of the user equipment, based on the indication, that the non-initial access attempt is barred by the network;

determining, using the lower layers of the user equipment below the NAS layer of the user equipment, that the user equipment is dual-registered to the network via both 3GPP access and non-3GPP access;

determining, using the lower layers of the user equipment below the NAS layer of the user equipment, what triggered the non-initial access attempt;

determining, using the lower layers of the user equipment below the NAS layer of the user equipment, that the non-initial access attempt and the barring by the network are associated with 3GPP access;

in an instance in which the lower layers of the user equipment below the NAS layer of the user equipment determines that the user equipment is dual-registered to the network via both 3GPP access and non-3GPP access, the non-initial access attempt was triggered by a request from upper layers of the user equipment to send an uplink NAS transport message to establish a PDU session or to request modification of a PDU session, and the uplink NAS transport message comprises a request to send a mobile originated short message service (SMS) at the NAS layer of the user equipment, transmitting, using the lower layers of the user equipment below the NAS layer of the user equipment, the uplink NAS transport message towards the network via non-3GPP access; and in an instance in which the lower layers of the user equipment below the NAS layer of the user equipment determine that the barring of the non-initial access attempt is alleviated for 3GPP access, starting a mobile-initiated NAS transport procedure to send the mobile originated SMS at the NAS layer of the user equipment towards the network over 3GPP access.

4. A user equipment comprising:

at least one processor; and at least one memory storing instructions that, when executed by the at least one processor, cause the user equipment to perform at least:

in an instance in which lower layers of the user equipment below a non-access stratum (NAS) layer of the user equipment determine that (i) the user equipment is dual-registered with a network over $3^{rd}$ Generation Partnership Project (3GPP) access and non-3GPP access, (ii) the user equipment is in a fifth-generation mobility management (5GMM)-CONNECTED mode with the network over 3GPP access, (iii) the user equipment is in either a Radio Resource Control (RRC) active state or an RRC inactive state, (iv) a non-initial access attempt to the network by upper layers of the user equipment over 3GPP access is barred by the network, (v) an event which triggered the non-initial access attempt via 3GPP access is a request from the upper layers of the user equipment to send an uplink NAS transport message towards the network to establish a packet data unit (PDU) session or to request modification of a PDU session, and (vi) the uplink NAS transport message comprises a request to send a mobile originated short message service (SMS) towards the network via the NAS layer of the user equipment, and (vii) the non-initial access attempt and barring are associated with 3GPP access, transmitting the uplink NAS transport message towards the network via non-3GPP access; and in an instance in which the lower layers of the user equipment indicate that the barring of the non-initial access attempt is alleviated for 3GGP access, initiating a mobile-initiated NAS transport procedure to send the mobile originated SMS at the NAS layer of the user equipment towards the network over 3GPP access.

5. A method comprising:

in an instance in which lower layers of a user equipment below a non-access stratum (NAS) layer of the user equipment determine that (i) the user equipment is dual-registered with a network over $3^{rd}$ Generation Partnership Project (3GPP) access and non-3GPP access, (ii) the user equipment is in a fifth-generation mobility management (5GMM)-CONNECTED mode with the network over 3GPP access, (iii) the user equipment is in either a Radio Resource Control (RRC) active state or an RRC inactive state, (iv) a non-initial access attempt to the network by upper layers of the user equipment over 3GPP access is barred by the network, (v) an event which triggered the non-initial access attempt via 3GPP access is a request from the upper layers of the user equipment to send an uplink NAS transport message towards the network to establish a packet data unit (PDU) session or to request modification of a PDU session, and (vi) the uplink NAS transport message comprises a request to send a mobile originated short message service (SMS) towards the network via the NAS layer of the user equipment, and (vii) the non-initial access attempt and barring are associated with 3GPP access, transmitting the uplink NAS transport message towards the network via non-3GPP access; and in an instance in which the lower layers of the user equipment indicate that the barring of the non-initial access attempt is alleviated for 3GPP access, initiating a mobile-initiated NAS transport procedure to send the mobile originated SMS at the NAS layer of the user equipment towards the network over 3GPP access.

\* \* \* \* \*

UNITED STATES PATENT AND TRADEMARK OFFICE
CERTIFICATE OF CORRECTION

PATENT NO. : 12,137,408 B2
APPLICATION NO. : 17/256476
DATED : November 5, 2024
INVENTOR(S) : Sung Hwan Won Page 1 of 1

It is certified that error appears in the above-identified patent and that said Letters Patent is hereby corrected as shown below:

In the Claims

In Column 12, Line 41, Claim 1, delete "user equipment" and insert -- user equipment, --, therefor.

In Column 13, Line 17, Claim 3, delete "3rd Generation" and insert -- $3^{rd}$ Generation --, therefor.

In Column 14, Line 37, Claim 4, delete "and (vi)" and insert -- (vi) --, therefor.

In Column 15, Line 3, Claim 5, delete "and (vi)" and insert -- (vi) --, therefor.

Signed and Sealed this
Twenty-fifth Day of March, 2025

Coke Morgan Stewart
*Acting Director of the United States Patent and Trademark Office*